INVENTORS
HERBERT E. CONKEY
WILLIAM L. BATCHELOR
DONALD B. THOMPSON
BY Joseph J. Connerton
ATTORNEY INVENTORS
HERBERT E. CONKEY
WILLIAM L. BATCHELOR
DONALD B. THOMPSON
BY Joseph J. Connerton
ATTORNEY INVENTORS
HERBERT E. CONKEY
WILLIAM L. BATCHELOR
DONALD B. THOMPSON
BY Joseph J. Connerton
ATTORNEY 2,975,017

OPTICAL FREQUENCY GENERATOR FOR MAGNETIC TIMING AND INDEX TRACKS

Herbert E. Conkey, Poughkeepsie, William L. Batchelor, Fishkill, and Donald B. Thompson, Poughkeepsie, N.Y., assignors to International Business Machines Corporation, New York, N.Y., a corporation of New York Filed Mar. 30, 1955, Ser. No. 497,848

13 Claims. (Cl. 346—74)

The present invention relates to an apparatus for producing drum timing signals and more particularly to an improved apparatus for recording a closed timing and an indexing channel or track on the surface of a rotating magnetic record member.

In a recording system utilized with a computer or other systems wherein information is stored on the magnetic surface of the record member, it is frequently necessary to establish a timing relationship between the recording system and the computer or other system sending information to or receiving information from the record member. Such a record member may be required not only to establish a timing system to time its recording operations but to synchronize these operations with associated systems. This is accomplished in the present system by recording a timing track and an indexing track on a rotating record member. The timing track is a closed track containing a series of consecutive positive signals or binary "1's" recorded thereon, and serves to determine the location of axially positioned registers on the magnetic surface of the record member. The index track has a "1" recorded at an arbitrarily selected point thereon to establish a zero time reference point. In the ensuing description, a positive signal is referred to as a "1" signal, while a negative signal is referred to as a "0" signal. The index track has a series of signals equal to the number of signals in the timing track recorded thereon, the remaining signals other than the above described "1" being "0's."

Briefly stated, in accordance with the principles of the present invention, there is provided a rotatable optical disc secured to and adapted to rotate in synchronism with a magnetic drum. The disc is opaque except for a transparent band having a sinusoidal pattern thereon, and is positioned so as to rotate between a light source and a light sensitive transducer. When the light source is turned on, the rotating disc causes a sinusoidal variation in the quantity of light applied to the transducer. The transducer functions to provide a sinusoidal potential output, which in turn is applied to a Timing Pulse Generator (TPG) to produce two output pulses in response to each cycle of the sinusoidal input. An associated control circuit, when conditioned by the pulse output from the TPG, controls the generation of write signals for writing timing and index tracks on the rotating magnetic drum, as will be described in greater detail hereinafter.

A broad object of the present invention is to provide a electro-optic system for recording a closed timing track on a magnetic record member.

A specific object of the present invention is to provide an improved apparatus for recording a closed timing track on a rotating record member, such apparatus including an optical disc positioned between a light source and a light sensitive transducer and adapted to vary the quantity of light applied to the transducer in acocrdance with a predetermined pattern.

Another object of the present invention is to provide an improved method for recording a closed timing track on a magnetic record member comprising the steps of generating a substantially sinusoidal light pattern, converting the pattern to a sinusoidal potential and converting the potential to a series of control pulses adapted to control the polarity and duration of the signals recored on the timing track as the record member rotates.

Still another object of the present invention is to provide an improved apparatus for recording a closed timing and an index track on a magnetic record member of the continuous loop type comprising an optical generator adapted to generate a predetermined light pattern, an optical transducer for converting the light patten to a corresponding electrical signal and means for converting said electrical signal to pulses which control recording heads associated with the timing and index tracks to record signals of a predetermined duration and polarity thereon.

Other objects of the invention will be pointed out in the following description and claims and illustrated in the accompanying drawings, which disclose, by way of example, the principle of the invention and the best mode, which has been contemplated, of applying that principle.

Figures 3A, 3B, 3C:
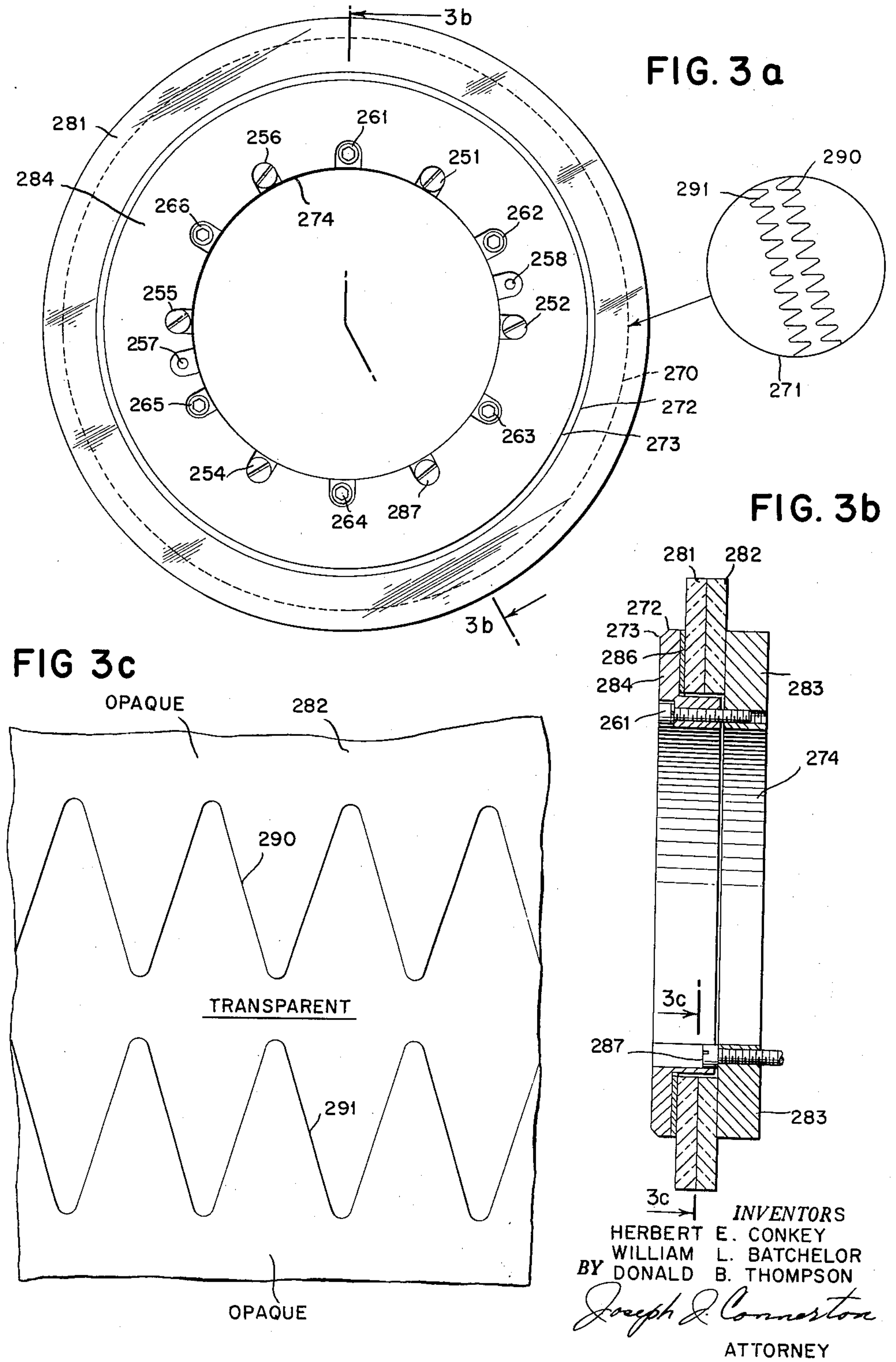

Fig. 3*a* illustrates a plan view of the optical timing disc.

Fig. 3*b* illustrates a sectional view of the optical timing disc.

Fig. 3*c* illustrates an enlarged view of the sinusoidal pattern on the optical timing disc.

Figure 1:
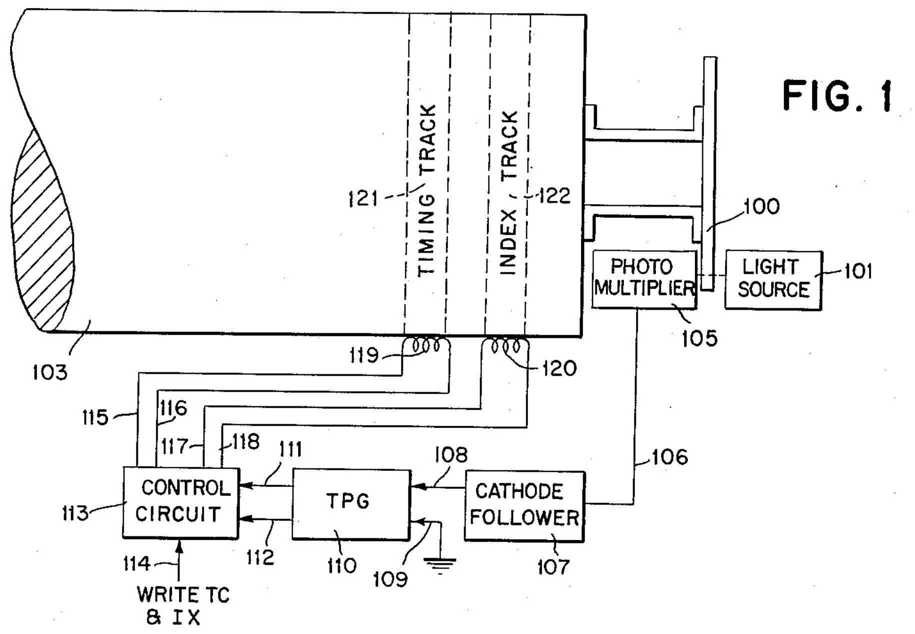
Fig. 1 illustrates in simplified block form a preferred embodiment of the present invention.
Figure 4:
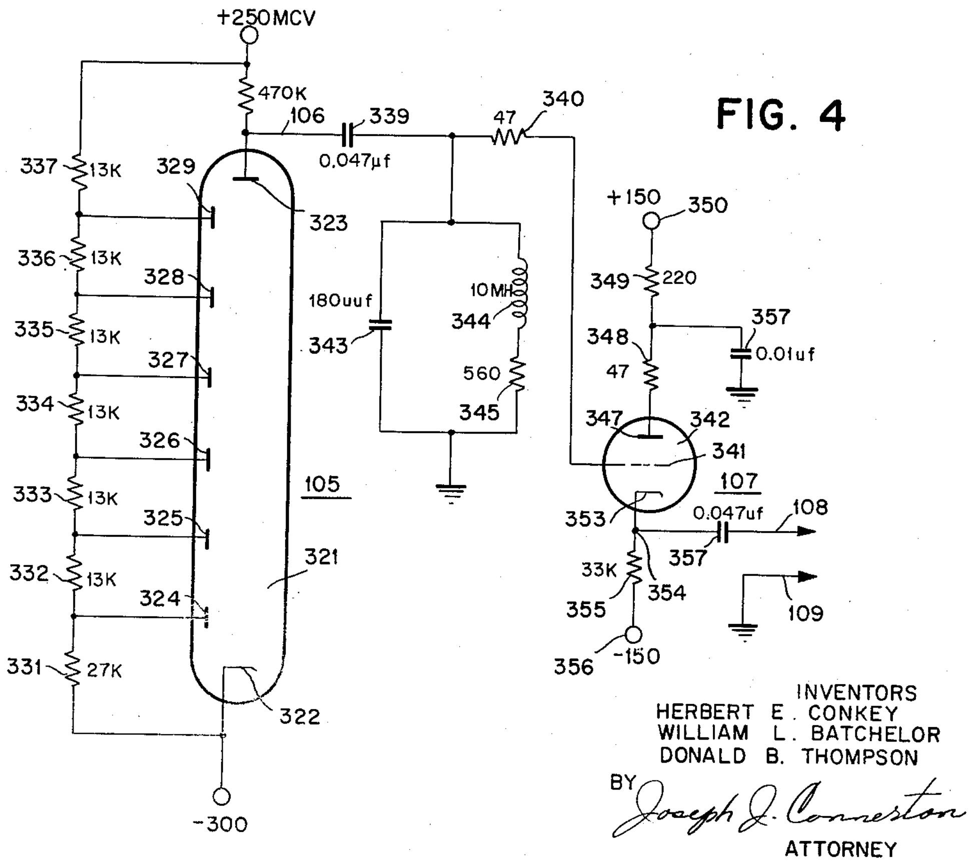

Fig. 4 illustrates in schematic form the optical transducer comprising a photomultiplier and output cathode follower shown as blocks 105 and 107 respectively in Fig. 1.

Throughout the following description and in the accompany drawings there are certain conventions employed which are familitar to certain of those skilled in the art. Additional information concerning those conventions is as follows:

In the logical or block diagrams of the drawing, a solid arrowhead is employed throughout the drawing to indicate (1) a circuit connection, (2) energization with standard positive pulses and (3) the direction of pulse travel which is also the direction of control. The standard positive pulse thus illustrated is a positive 1/10 microsecond pulse ranging in amplitude between 20 and 40 volts. A diamond-shaped arrowhead indicates (1) a circuit connection and (2) energization with a D.C. level. The D.C. levels employed in the present apparatus are on the order of 10 volts when positive and 30 volts when negative. The input and output lines of the block symbols are connected to the most convenient side of the block for ease of illustration. An input line to a corner of a block symbol and an output line from the adjacent corner of that block symbol indicates that the pulses or D.C. levels are applied to the input of the circuit represented by the block and the input conductor is electrically connected to the output conductor of the adjacent corner. Flip-flops are described as "set" and "reset." A positive signal applied to the "1" input is said to "set" the flip-flop and produce a positive signal at the corresponding output, while a positive signal applied to the "0" input is said to "reset" the flip-flop and produce a positive signal at the corresponding output.

Bold face character symbols appearing within a block identify the common name for the circuit represented, that is, FF identifies a flip-flop, GT a gate circuit, OR a logical OR circuit, and so forth. The character subscripts preceding bold face characters define the model of the circuit identified by the bold face character, that is, $_{A}FF$ identifies the model A flip-flop, $_{C}FF$ identifies the model C flip-flop and so forth.

In the description the general arrangement of a preferred embodiment of this invention will be described with respect to the manner in which the various circuit components and apparatus are interconnected as well as the general over-all operation which is performed by these components and apparatus. The description of the general arrangement will be followed by separate and detailed descriptions of the various components and apparatus which so require it.

Referring now to Fig. 1, there is illustrated a simplified drawing of the general arrangement of the present apparatus. A light beam from a light source 101 is directed through an optical disc 100 which is suitably mounted for rotation with magnetic drum 103. Optical disc 100 is provided with a closed sine wave pattern in a manner to be described in greater detail hereinafter, so that the quantity of light passing through it varies sinusoidally. In a preferred embodiment, the speed of the drum and therefore that of the attached disc is 2914 r.p.m., producing a sine wave with an approximate 10 microsecond period. The sine wave modulated output of light is collected by a photomultiplier 105, which converts the light pattern to electrical signals in the form of sine waves. Any suitable arrangement may be employed for transmission of light from a light source through the disc 100 to photomultiplier 105, the details of which are not essential for an understanding of the present invention. The output of photomultiplier 105 is connected through conductor 106 to cathode follower 107, the output of which in turn is connected through conductor 108 to a Timing Pulse Generator 110, hereinafter referred to as a TPG. The second input to the TPG 110 is a ground connection shown as conductor 109 which provides a reference level for the input signal on conductor 108. A continuous sinusoidal input is applied through conductor 108 which so conditions the TPG as to allow the production of short duration pulses, or "timing" pulses at each of the inputs' zero crossings. One output on conductor 111 exhibits pulses during positive-slope zero crossings, while the other output on conductor 112 occurs during negative-slope zero crossings of the input signal. Each output delivers a standard pulse, heretofore defined, at alternate input signal zero crossings, and the separate outputs occur at alternate zero-crossings. The pulses from each of the outputs occur at a pulse repetition frequency equal to the frequency of the input sinusoid, and the two outputs are separated by a time interval equal to the reciprocal of twice the input signal's frequency. In the preferred embodiment herein described, the pulse output on conductor 111 precedes the output on conductor 112 by 5 microseconds, and each output occurs at approximately a 100 kc. rate. The pulse outputs of TPG 110 on conductors 111 and 112 are called "time 1" or TP–1 and "time 3" or TP–3 pulses respectively, and are displaced in phase from one another by 180°. Timing Pulse Generator 110 may be of the type illustrated and described in copending application Serial Number 494,982 entitled "Magnetic Data Storage" filed by R. R. Everett et al. on March 17, 1955. The TP–1 and TP–3 pulses are applied to control circuit 113, which will be shown and described in greater detail hereinafter. Control circuit 113, when properly conditioned by a pulse on conductor 114, utilizes the pulse output from TPG–110 to control the energization of write heads 119 and 120 through conductors 115, 116 and 117, 118 respectively. The desired signals are written on the drum on two circumferential channels or tracks 121 and 122, hereinafter referred to as the timing track and index track respectively, each of which comprises that portion of the drum which passes under the associated write heads 119 and 120 respectively.

Figure 2:
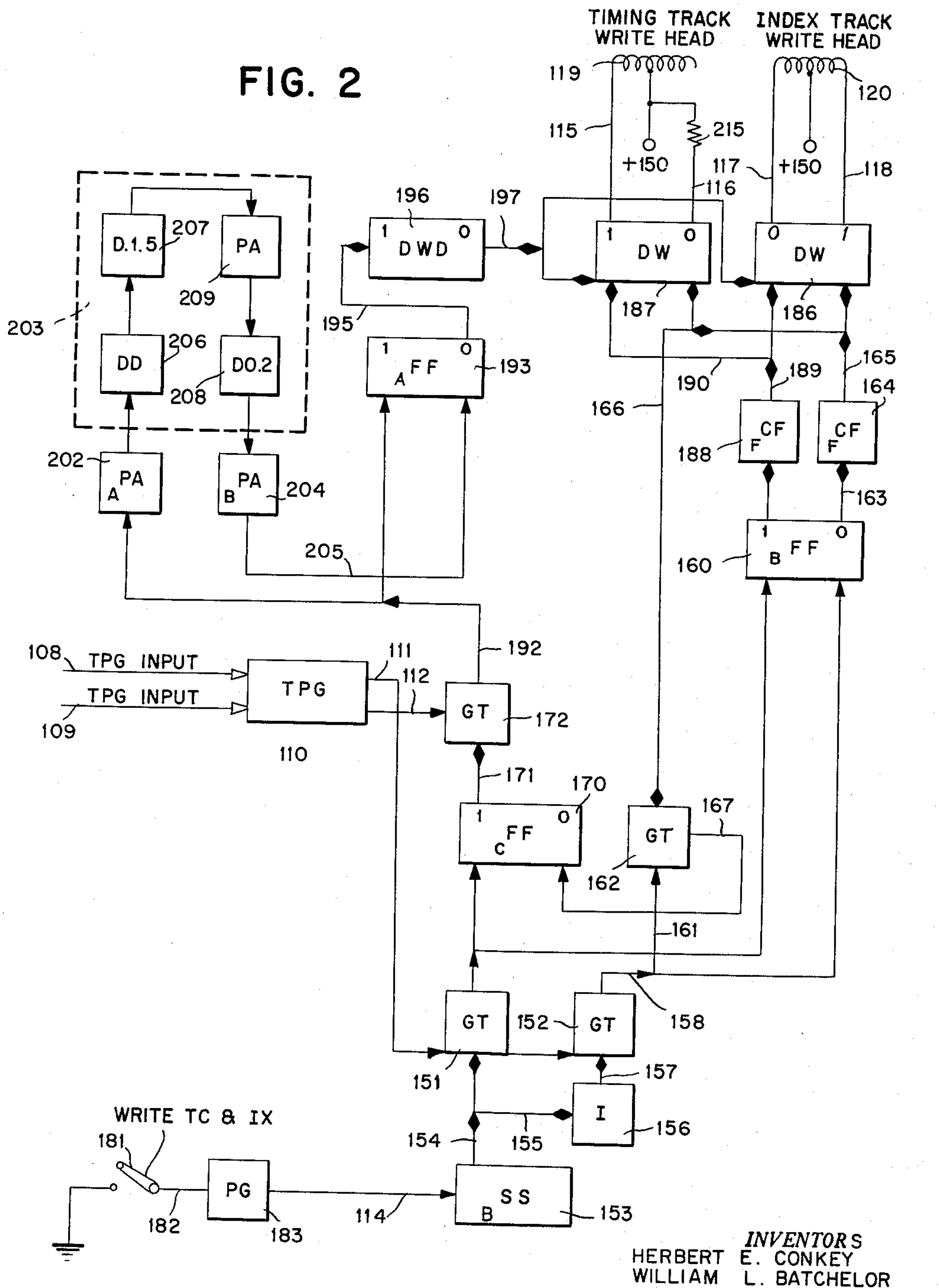
Fig. 2 illustrates in block schematic form the control circuit shown in block 113 as Fig. 1.

Referring now to Fig. 2, there is illustrated in block schematic form the control circuit shown as block 113 in Fig. 1. As previously noted, control circuit 113 utilizes the pulse output from TPG 110 to control the generation of write pulses for writing timing and index tracks 121 and 122 respectively. The first TP–1 pulse output from TPG 110 is applied through conductor 111 to sample gate circuits 151 and 152. Gate circuits 151 and 152 are vacuum tube "AND" gates which have only two inputs. One input is a D.C. level which conditions the circuit, the other is a relatively narrow pulse such as the standard 0.1 microsecond pulse heretofore defined. Gate 151 is conditioned by the output of a single shot multivibrator 153, which may be of the type illustrated and described in copending application Serial Number 474,346 entitled "Monostable Multivibrator" filed by W. L. Jackman, December 10, 1954. In the preferred embodiment herein described, multivibrator 153 is adapted to generate a 30 millisecond output. The stable state of single shot 153 is referred to as the "down" condition, under which the output level is approximately −30 volts, while the quasi-stable state is referred to as the "up" condition, under which the output level is approximately +10 volts. In the ensuing description, "up" and "down" condition of circuits defines output levels of +10 volts and −30 volts respectively. Single shot 153 is normally in the "down" condition, under which condition the output level of −30 volts on conductor 154 is insufficient to condition gate 151, and pulses applied thereto from TPG 110 are effectively blocked. The output of single shot 153 is also applied through conductor 155 to an inverter 156. Inverter 156 is a D.C. inverter which inverts the polarity of a signal level, so that its output on conductor 157 is positive when single-shot 153 is in the "down" condition. This output conditions gate 152 to pass pulses received from TPG 110 via conductor 111. The pulse output of gate 152 is applied through conductor 158 to the zero input of flip-flop 160, and through conductor 161 to gate 162. The first pulse applied to gate 152 produces a positive D.C. level on output conductor 163 of flip-flop 160, which is then applied through cathode follower 164 and conductors 165 and 166 to condition gate 162. However, the time delay required to condition gate 162 is such that the pulse which initiated the conditioning of gate 162 has terminated. Thereafter, however, each succeeding TP–1 pulse passes through gate 162 and resets flip-flop 170 via conductor 167. Output conductor 171 of flip-flop 170 therefore remains negative, while flip-flops 160 and 170 normally remain in the reset condition. Since conductor 171 applies a conditioning potential to gate 172, gate 172 is not conditioned when flip-flop 170 is reset, and any TP–3 pulses from TPG 110 and conductor 112 generated during this period are blocked. In this manner, the control circuit prevents a timing or indexing channel from being recorded prematurely on the drum prior to initiation of the process.

To initiate writing of the timing and indexing channels 121 and 122 respectively (Fig. 1), push button switch 181 is depressed, completing a ground return circuit through conductor 182 for pulse generator 183. Pulse generator 183 may be any device well known in the art which emits a single output pulse when energized by means of a switch or push button. The output signal from pulse generator 183 is applied through conductor 114 to trigger single-shot 153, which thereafter provides a positive D.C. level to conductor 154 for a period of 30 milliseconds. This output when inverted through inverter 156 produces a negative D.C. level on conductor 157, which blocks successive pulses from passing through gate 152 for the 30 millisecond period which single-shot 153 is up. Since the output of gate 152 resets flip-flops 160 and 170 through the above described circuits, these flip-flops remain set for the interval single-shot 153 is "up." Gate 151, however, is conditioned by single-shot 153 through conductor 154 to pass TP–1 pulses generated by TPG 110 and applied through conductor 111 to set flip-flops 60 and 70. The setting of flip-flop 160 conditions drum writers 186 and 187 through cathode follower 188 and conductors 189 and 190 respectively, while the setting of flip-flop 170 conditions gate 172 through conductor 171 to pass TP–3 pulses generated by TPG 110 and applied through output conductor 112. As heretofore described, TP–3 pulses on conductor 112, which recur at 10 microsecond intervals, are separated in time from TP–1 pulses on conductor 111 by 5 microseconds. These pulses pass through gate 172 and its output conductor 192 to set flip-flop 193, the negative output of which is then applied through conductor 195 to drum write driver 196. Drum write driver 196 is an inverter circuit which generates a positive signal on line 197 in response to a negative signal applied through conductor 195 to thereby sample drum writers 186 and 187. The drum writer is essentially a push pull amplifier which amplifies the D.C. level from an associated flip-flop and applies it to an associated recording head. Because drum writers 186 and 187 have been conditioned as heretofore described, pulses of write current are applied during this sampling through conductors 115, 116 and 117, 118 to the timing channel and index channel write heads 119 and 120 respectively.

As is well known in the computer art, magnetic recording or writing on a drum track is performed by passing a direct current through the associated recording or write head, such head generally consisting of a coil having a laminated magnetic core and an air gap. The passage of a direct current through the coil in one direction causes a magnetic area on the drum surface to have a polarity denoted as binary "1"; passage of a direct current through the coil in the opposite direction causes a magnetic area on the drum surface to have a polarity denoted as binary "0." In the drum writer associated with the preferred embodiment herein described, each write coil is center-tapped, one half of the coil being used for writing a binary "1," the other half being used for writing a binary "0." As will be described in greater detail hereinafter, only that half of the coil for writing a binary "1" is utilized in the timing track write head 119. From the preceding description, it will be noted that during the interval that single-shot 153 is up, write head 119 is so connected that a binary "1" is written in timing track 121 each time drum writer 187 is sampled, while write head 120 is so connected that a binary "0" is written in index track 122 each time drum writer 186 is sampled.

The pulse output from gate 172 is also applied through conductor 192 and pulse amplifier 202 to a 1.7 mircosecond delay circuit 203, the output of which resets flip-flop 193 through pulse amplifier 204 and conductor 205. This resetting of flip-flop 193 produces a positive D.C. level on conductor 195, which is inverted by drum write driver 196 to a negative D.C. level which terminates the sampling of drum writers 186 and 187 through conductor 197. The write signals applied by drum write driver 196 to drum writers 186 and 187 therefore have a duration of 1.7 microseconds. Delay circuit 203 comprises delay driver 206, which amplifies the 0.1 microsecond pulse from pulse amplifier 202 to a sufficient level to drive delay lines 207 and 208. Pulse amplifiers 209 and 204 compensate for the attenuation in signal level produced by delay units 207 and 208 respectively to a sufficient level to reset flip-flop 193.

During the 30 millisecond period that single-shot 153 is "up," the drum makes approximately 1.5 revolutions, recording 1's on the timing track and 0's on the index track at 10 mircosecond intervals as above described. The 30 millisecond period provides a safe operating margin to insure that sufficient time is available to write a complete track.

At the end of the 30 millisecond interval, the operation of the device is terminated in the following manner. When single-shot 153 reverses to its stable or "down" condition, its output on conductor 154 reverses to a level of approximately −30 volts. Under this condition gate 151 is not conditioned and succeeding TP–1 pulses are blocked from passing through gate 151 to set flip-flop 160 and 170. The negative output on conductor 154 is applied through conductor 155 to inverter 156, where it is inverted to a positive level which conditions gate 152 through conductor 157. The next TP–1 pulse received from conductor 111 passes through gate 152 via conductor 158 to reset flip-flop 160. This pulse on conductor 158 is also applied to gate 162, but is blocked because the gate has not yet been conditioned by the "0" output of flip-flop 160. This is due to the slow transition time of the flip-flop compared with the duration of the output pulse from gate 152. Flip-flop 160, when reset, conditions drum writers 186 and 187 through conductor 163, cathode follower 164 and conductor 165. Drum writers 186 and 187 are so conditioned through conductor 165 as to record, when sampled, a "1" and a "0" on the index and timing tracks respectively. The positive D.C. level on conductor 165 is also applied through conductor 166 to condition gate 162. Since drum writer 187 has been reset, the pulse of write current from the "0" output of drum writer 187 passes through a resistor 215 to the center tap of write head 119. As shown in Fig. 2, the "0" half of write head 119 is shunted to prevent "0's" from being written on the timing track. Thus the reversal of current through write head 119 produces no change in the signals recorded on the timing track. The pulse of write current from drum writer 186, however, passes through write head 120 in a direction opposite that of previous write pulses, thus writing a "1" in the index track. The duration of the latter pulse is limited to 1.7 microseconds by delay circuit 203 in the manner heretofore described.

The next TP–1 pulse from TPG–110 applied to line 111 produces an output from gate 152 to reset flip-flop 160 via conductor 158. Flip-flop 160, however, is already reset. This pulse on conductor 158 also samples gate 162, which is now conditioned by the "0" output of flip-flop 160 as described heretofore. The resulting pulse output from gate 162 is applied through conductor 167 to reset flip-flop 170, thus causing output conductor 171 of flip-flop 170 to drop to a level of −30 volts thereby deconditioning gate 172. Since gate 172 is no longer conditioned, further TP–3 pulses from conductor 112 are blocked from drum writers 186 and 187. Thus the writing operation is completed and the circuits have returned to normal. To terminate the writing operation, light source 101 may be turned off by a conventional switching arrangement, not shown herein.

The above described operation results in a succession of "1's" being written in the timing track and a succession of "0's" and a single "1" being written in the index track.

Referring now to Fig. 3, there is illustrated therein the structural details of the optical timing disc shown in simplified form as disc 100 in Fig. 1. Basically the disc consists of two glass plates providing an opaque surface except for a transparent band near the outer edge whose width varies sinusoidally as indicated in Fig. 3*c*. In the preferred embodiment herein described, the transparent band contains a total of 2048 wave form cycles in which the last is re-entrant with the first.

Referring now to diagram *a* of Fig. 3, there is shown a plan view of the optical timing disc illustrating the mounting details by which the disc is secured to the drum. Mounting holes 251 through 256 provide openings through which the disc is bolted to the drum, while dowels 257 and 258 are utilized for rotational alignment of the disc with respect to the drum. Bolts 261 through 266 clamp the glass plates together in the manner shown and described with reference to Fig. 3*b*. The band containing the sine waves is indicated by dotted line 270, a section of which is illustrated in enlarged form within circle 271. Lines 272 and 273 indicate the beveled edge of the mounting disc, while line 274 indicates the inner circumference of the disc. In the preferred embodiment herein described, the optical timing disc has an outer diameter of 8 inches, while the outer diameter of the band containing the etched sine wave patterns, indicated by dotted line line 270, is 7½ inches. The section indicated by Fig. 3b will be described with reference thereto.

Curve 290 and 291 comprise a total of 2,048 substantially identical sine waves. As shown more clearly in the enlarged view 271 of Fig. 3a, curve 290 is at a slightly greater distance from the center of the disc than curve 291, producing an extremely slight variation in size and phase of the corresponding sine waves. In the pattern for the preferred embodiment herein described, each sine wave of curves 290 and 291 is approximately .012" in duration, the peak to peak distance between curves 290 and 291 is approximately .036", while the minimum distance between the curves is approximately .005".

While the details of the optical system for directing the light through the photomultiplier have been omitted as unnecessary for an understanding of the present invention, it should be noted that the light from the light source is focused through a slit before being applied to the disc. The slit permits the light to be focused on a particular section of the pattern as it revolves past the light source. The width of the slit is a design feature determined by the optimum operating point for the optica system. In the preferred embodiment herein described, the optimum width for maximum signal to noise ratio is equal to the length of a half sine wave, or .006", while the height of the slot is greater than the peak to peak value of the signal pattern, or .050". Using this size slot, the light intensity of the light source is not excessive, the light intensity is above the noise level of the photomultiplier and the photomultiplier is not required to operate in the saturation region. In view of the above considerations, the size of a slot for different patterns or different size discs is a matter of design for one skilled in the art.

Referring now to diagram b of Fig. 3, there is illustrated a sectional view of the optical timing disc taken along the indicated section in Fig. 3a. Glass discs 281 and 282, having the etched sine wave pattern therebetween, are clamped between a metal clamping plate 283 and a mounting disc 284 by bolts such as 261. While the pattern is assumed to be on the inner surface of glass disc 282, it is apparent that the pattern could be on the inner surface of glass disc 281 or on a separate band between discs 281 and 282. A protective band of resilient material 286 is used to insulate glass disc 281 from mounting disc 284. Mounting disc 284, as previously noted, has a beveled edge indicated as edges 272 and 273. Openings are provided for securing the optical disc assembly to drum member 103 through bolts 287.

Referring now to diagram c of Fig. 3, there is illustrated an enlarged view of the sinusoidal pattern shown as dotted line 270 and circle 271 in Fig. 3a. The two requirements for this pattern are that there be one sine wave for each timing signal to be written on the drum and that the last sine wave cycle be reentrant with the first. It is apparent that the number of cycles in the sinusoidal pattern will vary according to the application, and is limited only by the requirements specified above. As shown, the pattern comprises two sinusoidal curves 290 and 291, these curves being identical but displaced 180° with respect to each other. The area within the curves is transparent, while the remainder of the band is opaque. Thus the quantity of light passing through the band will vary sinusoidally as the disc rotates past the light source.

Referring now to Fig. 4, there is illustrated a circuit schematic of photomultiplier 105 and cathode follower 109 shown in block form in Fig. 1. As is well known in the electrical art, a photomultiplier is an optical transducer responsive to a light input and adapted to generate a potential varying substantially as a function of the light input. While the same function is performed by a photoelectric cell, a photomultiplier is utilized in the preferred embodiment due to the greater magnitude of the potential generated thereby as compared to the corresponding potential generated by a photocell. By use of a photomultiplier circuit, the phenomenon of secondary emission is utilized to increase the current output to the desired level.

Photomultiplier circuit 105 includes a photomultiplier tube 321 having a light-sensitive cathode 322, a final anode 323, and a plurality of intermediate anodes or dynodes 324 through 329 inclusive. The term dynode indicates that each of the elements so described functions as a cathode with respect to the succeeding like element maintained at a more positive potential. The successively increasing potentials applied to intermediate dynodes 324 through 329 are obtained by means of a voltage divider network comprising resistors 331 through 337. Each dynode together with the associated section of the voltage divider network is termed a stage. In the preferred embodiment shown in Fig. 4, a total potential of 550 volts is applied across the voltage divider network. The potential developed across resistor 331 is approximately 141 volts, so that the potential at dynode 324 is approximately −159 volts. The potential at each of the remaining stages as measured at the dynode increases successively by approximately 68 volts per stage. When light generated by the optical timing disc in the manner described heretofore strikes light-sensitive cathode 322, the electrons emitted therefrom flow to dynode 324. Since dynodes 324 through 329 are made of a material particularly suitable for secondary emission, more electrons are emitted from dynode 324 than arrive from cathode 322. Since dynode 325 is at a positive potential with respect to dynode 324, it functions as an anode and secondary emission again takes place when the electrons emitted by dynode 324 strike dynode 325. The electron emission is thus progressively increased as the electrons travel successively through the intermediate dynodes to final anode 323, which receives the final output current. While photomultiplier tube 321 is illustrated schematically in Fig. 4, the electrodes therein are so shaped and arranged that the electron flow follows the above described path between the various electrodes.

The output from anode 323 is A.C. coupled through conductor 106, capacitor 339 and parasitic suppressor 340 to control grid 341 of cathode follower tube 342. Tube 342 and its associated circuits comprise the cathode follower shown as block 107 in Fig. 1. Cathode follower 107 functions as an impedance matching device between the high impedance input from photomultiplier 105 and the low impednace load provided by TPG–110. A tuned circuit comprising capacitor 343, coil 344 and resistor 345 is interconnected between the output of photomultiplier 105 and cathode follower 107, and functions to filter unwanted noise. The circuit is tuned to the mid-frequency of the output pulse, thereby increasing the mid-frequency response to the output pulse from photomultiplier 105. Resistor 345 is employed to lower the Q of the circuit to provide for slight frequency variation resulting from a possible variation in rotational speed of the record member. Cathode follower circuit 107 further includes anode 347 connected through parasitic suppressor 348 and resistor 349 to the plate supply shown as terminal 350. Resistor 349 and capacitor 351 constitute a decoupling network associated with anode 347. Cathode 353 is connected through terminal 354 and cathode resistor 355 to a negative source of potential shown as terminal 356. The output of the cathode follower is A.C. coupled through capacitor 357 and conductor 108 to TPG–110 as shown and described heretofore with reference to Figures 1 and 2.

Various basic circuits have been shown in block form throughout the preceding description. While a detailed description of such circuits is not believed necessary for an understanding of the present invention, such circuits may be of the type illustrated and described in copending applications noted below.

Each of the following circuits may be of the type shown and described in copending application Serial Number 494,982 entitled "Magnetic Data Storage" filed by R. R. Everett et al. on March 17, 1955.

| Title | Abbreviation | Description Page Number | Figure |
|---|---|---|---|
| Timing Pulse Generator | TPG | 49-55 | 16 |
| Drum Write Driver | DWD | 55-57 | 17 |
| Drum Writer | DW | 59-60 | 19 |
| Delay Driver | DD | 60-61 | 20 |
| Model C Flip-Flop | cFF | 61-65 | 21 |
| Model A D.C. Inverter | AI | 65-66 | 22 |

Each of the following circuits may be of the type illustrated and described in U.S. Patent 2,914,248 a continuation of abandoned copending application Serial Number 471,002 entitled "Electronic Data Processing Machine" filed by H. D. Ross et al. on November 24, 1954.

| Title | Abbreviation | Description Page Number | Figure |
|---|---|---|---|
| Model A Flip-Flop | AFF | 136-142 | 45 |
| Gate Circuit | GT | 142-144 | 46 |
| Model B Pulse Amplifier | BPA | 144-145 | 47 |
| Model A Pulse Amplifier | APA | 145 | 48 |
| Model F Cathode Follower | FCF | 146-148 | 49 |
| Delay Unit | D | 152-153 | 51 |

The model B flip-flop shown as block 160 in Fig. 2 may be of the type shown and described in copending application Serial Number 473,874 entitled "Electronic Ring Circuit" filed by R. E. Nienburg on December 8, 1954.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A system adapted to record a closed timing track on a continuous loop type of magnetic record member comprising means for generating a predetermined light pattern, means responsive to said light pattern for generating a corresponding potential varying in amplitude and waveform substantially in accordance with the variation of said light pattern, means for converting said potential to a succession of signals having a repetition rate determined by said potential a recording head positioned adjacent to said record member and means for energizing said recording head with said succession of signals for duration sufficient to complete said closed timing track as said record member rotates.

2. A system adapted to record a closed timing track on a continuous loop type of magnetic record member comprising means for generating a predetemined light pattern, means responsive to said light pattern for generating a corresponding potential varying in amplitude and waveform substantially in accordance with the variation of said light pattern, means for converting said potential to a succession of pulses having a repetition rate determined by the frequency of said potential, a recording head positioned adjacent to said record member and means for energizing said recording head with said succession of pulses for a duration sufficient to complete said closed timing track as said record member rotates, said means for energizing said recording head including means responsive to said succession of pulses for controlling the polarity and duration of the signals applied to said recording head.

3. A system adapted to record a closed timing track on a magnetic record member of the continuous loop type comprising in combination, means for generating a predetermined light pattern, means for converting said predetermined light pattern to a potential varying in amplitude substantially as a function of said light pattern, means responsive to said potential for generating a succession of pulses at a repetition rate which is a function of said potential, a recording head positioned adjacent to said timing track, means for rotating said record member and a control circuit responsive to said succession of pulses for energizing said recording head with a succession of signals of uniform polarity and duration so as to record a closed timing track as said record member rotates.

4. A system adapted to record a closed timing track on a rotating magnetic record member comprising means for generating a light pattern of sinusoidally varying intensity, means adapted to generate a potential varying substantially as the light intensity applied thereto, a timing pulse generator adapted to generate a succession of pulses having a repetition rate corresponding to that of said potential, a recording head positioned adjacent to said timing track and means responsive to said succession of signals for energizing said recording head at substantially constant intervals for a predetermined duration as said record member rotates to thereby record a succession of uniformly spaced signals on said timing track.

5. A magnetic recording system for automatically recording a closed timing track around the magnetizable periphery of a rotatable record member comprising a light source, a light sensitive transducer operative to generate a potential varying substantially as the intensity of the light applied thereto, means for varying the intensity of the light applied to said light sensitive transducer in accordance with a predetermined pattern, means responsive to the potential generated thereby for producing a succession of pulses having a repetition rate determined by the period of said potential, a recording head positioned adjacent to said timing track on said record member, means for providing relative motion between said record member and said recording head and a control circuit responsive to said succession of signals for energizing said recording head at substantially uniform intervals for the time interval required for a complete record member revolution.

6. A magnetic recording system of the type claimed in claim 5 wherein said means for varying the intensity of the light applied to said light sensitive transducer comprises a disc having a transparent pattern and an opaque background, said disc being interposed between said light source and said light sensitive transducer and rotated in synchronism with said record member.

7. A magnetic recording system of the type claimed in claim 6 wherein said transparent pattern comprises a band around said disc having a sinusoidally varying width.

8. An apparatus adapted to record a closed timing track on a rotating drum member comprising a light source, an opaque disc mounted adjacent to said light source and having a transparent pattern thereon, said disc being secured to said drum member so as to rotate in synchronism therewith, an optical transducer mounted adjacent to said disc for generating a potential varying substantially as a function of the pattern of light passing through said transparent band, a timing pulse generator connected to said transducer and adapted to generate a succession of pulses in response to the potential pattern applied thereto and control means responsive to said succession of pulses for conditioning and sampling a writing head associated with said timing track at predetermined and uniform intervals to thereby write a series of uniformly spaced signals around said timing track.

9. A magnetic recording system adapted to automatically record a closed timing track on a rotating record member comprising a light source, means for filtering said light source to obtain a sinusoidal light pattern, a transducer responsive to said sinusoidal light pattern for generating a succession of sine wave potentials, means for converting each of said sine wave potentials to first and second pulses, the time period between said first and second pulses being determined by the period of said sine wave potentials, means responsive to said first pulse for conditioning a write head associated with said timing track, means responsive to said second pulse for sampling said write head for a predetermined interval whereby each sampling results in a signal being written on said timing track and means for controlling the duration of this operation to the time required for writing a complete timing track.

10. An electron optical apparatus for recording a closed timing track on a rotatable record member comprising a light source, an optical transducer adapted to generate a potential varying substantially as a function of a light source impressed thereon, an opaque disc secured to said record member having a transparent sinusoidal pattern thereon, said disc being interposed between said light source and said optical transducer to thereby control the intensity of the light pattern applied to said transducer, means for converting the sinusoidal potential output from said optical transducer to a succession of pulses, a recording head positioned adjacent to said timing track, means for providing relative motion between said recording head and said record member, a control circuit responsive, when conditioned, to said succession of pulses, means for conditioning said control circuit and thereby generating a series of signals, the polarity and duration of which are controlled by said control circuit and means to energize said recording head with said series of signals during the period of relative motion between said recording head and said record member so as to record a succession of uniformly spaced signals on said timing track.

11. A magnetic recording system adapted to record a plurality of tracks on a rotatable record member comprising means for generating a light pattern having a predetermined intensity, means responsive to said light pattern for generating a potential varying substantially as a function of the intensity of said light pattern, means responsive to said potential for producing a succession of signals having a repetition rate determined by said potential, a plurality of recording heads positioned adjacent to said record member, means for providing relative motion between said recording heads and said record member, control means responsive to said succession of signals for generating a succession of pulses of substantially uniform duration and means for energizing the magnetizable areas of said record member associated with said plurality of record tracks to thereby record a plurality of uniformly spaced signals around the tracks associated with said recording heads.

12. A magnetic recording system for recording a timing and an index track comprising a rotatable record member having a magnetizable periphery, a timing and an index track extending circumferentially about the periphery of said record member, first and second recording heads positioned adjacent to said timing and index tracks respectively, a light source, an optical transducer adapted to convert a quantity of luminous flux into a potential varying substantially as a function of said flux, means associated with said light source for varying said luminous flux in accordance with a predetermined pattern, means responsive to the potential from said transducer to generate a succession of signals having a repetition rate determined by the frequency of said potential, a control circuit energized by said signals for sampling said first and second recording heads at predetermined intervals, and means to rotate said record member for at least one complete revolution to thereby record timing and index signals on their corresponding tracks as said record member rotates.

13. A magnetic recording system of the type claimed in accordance with claim 12 wherein said means for varying said luminous flux in a predetermined pattern comprises an opaque disc having a transparent pattern corresponding to said predetermined pattern.

References Cited in the file of this patent

UNITED STATES PATENTS

| | | |
|---|---|---|
| 2,169,842 | Kannenberg | Aug. 15, 1939 |
| 2,540,654 | Cohen | Feb. 6, 1951 |
| 2,563,647 | Hammond | Aug. 7, 1951 |
| 2,578,083 | Montani | Dec. 11, 1951 |
| 2,585,291 | Wittel | Feb. 12, 1952 |
| 2,702,380 | Brustman et al. | Feb. 15, 1955 |
| 2,782,398 | West et al. | Feb. 19, 1957 |

UNITED STATES PATENT OFFICE

CERTIFICATION OF CORRECTION

Patent No. 2,975,017 March 14, 1961

Herbert E. Conkey et al.

It is hereby certified that error appears in the above numbered patent requiring correction and that the said Letters Patent should read as corrected below.

Column 1, line 60, for "a", second occurrence, read -- an --; column 2, line 4, for "recored" read -- recorded --; line 11, for "patten" read -- pattern --; line 38, for "familitar" read -- familiar --; same column 2, line 61, for '"reset."' read -- "reset". --; column 4, line 69, for '"up."' read -- "up". --; line 73, for "60 and 70" read -- 160 and 170 --; column 7, line 4, strike out "line", second occurrence; line 25, for "opticla" read -- optical --; same column 7, line 58, for "reentrant" read -- re-entrant --; column 8, line 51, for "impednace" read -- impedance --; column 9, line 58, after "for" insert -- a --.

Signed and sealed this 26th day of September 1961.

(SEAL)
Attest:

ERNEST W. SWIDER
Attesting Officer

DAVID L. LADD
Commissioner of Patents